United States Patent [19]

Tarozzi

[11] Patent Number: 4,694,738

[45] Date of Patent: Sep. 22, 1987

[54] AUTOMATIC DRIP COFFEE MAKER

[75] Inventor: Richard A. Tarozzi, Gales Ferry, Conn.

[73] Assignee: King-Seeley Thermos Co., Del.

[21] Appl. No.: 818,771

[22] Filed: Jan. 14, 1986

[51] Int. Cl.⁴ .............................................. A47J 31/00
[52] U.S. Cl. ...................................... 99/279; 99/295; 248/311.3
[58] Field of Search .................. 99/279, 295, 300, 306, 99/304, 305, 284; 426/433; 248/311.3, 312, 312.1; 211/74

[56] References Cited

U.S. PATENT DOCUMENTS

| | | | |
|---|---|---|---|
| 1,958,781 | 5/1934 | Beukema | 248/312 |
| 4,457,217 | 7/1984 | Ogawa | 99/295 |
| 4,540,146 | 9/1985 | Basile | 99/279 |

*Primary Examiner*—Robert W. Jenkins
*Attorney, Agent, or Firm*—Harness, Dickey & Pierce

[57] ABSTRACT

Two embodiments of automatic drip coffee makers particularly adapted to be mounted other than on a counter top. In each embodiment, the coffee maker brews coffee into an associated container that is supported by other than its base. The container is preferably of the thermally insulated type and in one embodiment it is supported by means of a bayonet connection to the exterior of its neck and in the other embodiment it is supported by a screw threaded connection between the filter compartment of the coffee maker and the internally threaded neck of the container.

12 Claims, 3 Drawing Figures

AUTOMATIC DRIP COFFEE MAKER

BACKGROUND OF THE INVENTION

This invention relates to an automatic drip coffee maker and more particularly to an improved, compact automatic drip coffee maker adapted for support under a cabinet or on a wall rather than on a kitchen counter.

The use of automatic drip coffee makers is well known and widespread. This type of device has enjoyed considerable commercial success. However, the basic configuration of the types of automatic drip coffee makers presently in commercial use is such that they, of necessity, must be mounted on the counter top. Although devices have been proposed for under-cabinet mounting, these devices are constructed and have their components arranged much in the same manner as the counter top units and hence occupy a considerable space and offer no saving for under the cabinet mounting.

It is, therefore a principal object of this invention to provide an improved under the cabinet automatic coffee maker.

It is a further object of this invention to provide an improved automatic coffee maker wherein the components are arranged and configured so as to provide a compact nature that lends itself to mounting other than on a counter top.

One reason for the relatively large size and configuration of conventional automatic drip coffee makers is the fact that they brew their coffee into non-insulated flasks or containers. As such, the container into which the coffee is brewed is maintained upon a heated base so that the coffee will be maintained at an elevated temperature for consumption during an extended period of time. In addition to the spatial disadvantages presented by the use of such heated bases, the quality of the brewed coffee deteriorates with time. That is, as heat is continually applied to the brewed coffee, some evaporation will occur and the coffee becomes unduly strong if it is kept for any length of time on such automatic coffee makers embodying heated bases.

It is, therefore a still further object of this invention to provide an automatic coffee maker that does not rely upon heating of the coffee in the container to keep it at the desired serving temperature.

SUMMARY OF THE INVENTION

This invention is adapted to be embodied in an automatic coffee maker that is adapted to be supported by means other than standing upon a counter top. The coffee maker comprises a main housing that carries a water compartment that is adapted to hold an amount of water. Heating means are provided for heating water from the water compartment and a filter compartment is carried by the housing and is adapted to contain coffee. Means communicate the heated water from the heating means to the filter compartment. The filter compartment has a brewed coffee outlet for discharging a liquid brewed coffee. Container supporting means are carried by the housing and are adapted to support a brewed coffee container other than by its base and with its mouth adapted to receive the brewed coffee from the filter compartment.

DETAILED DESCRIPTION OF THE PREFERRED EMBODIMENTS

Figure 1:
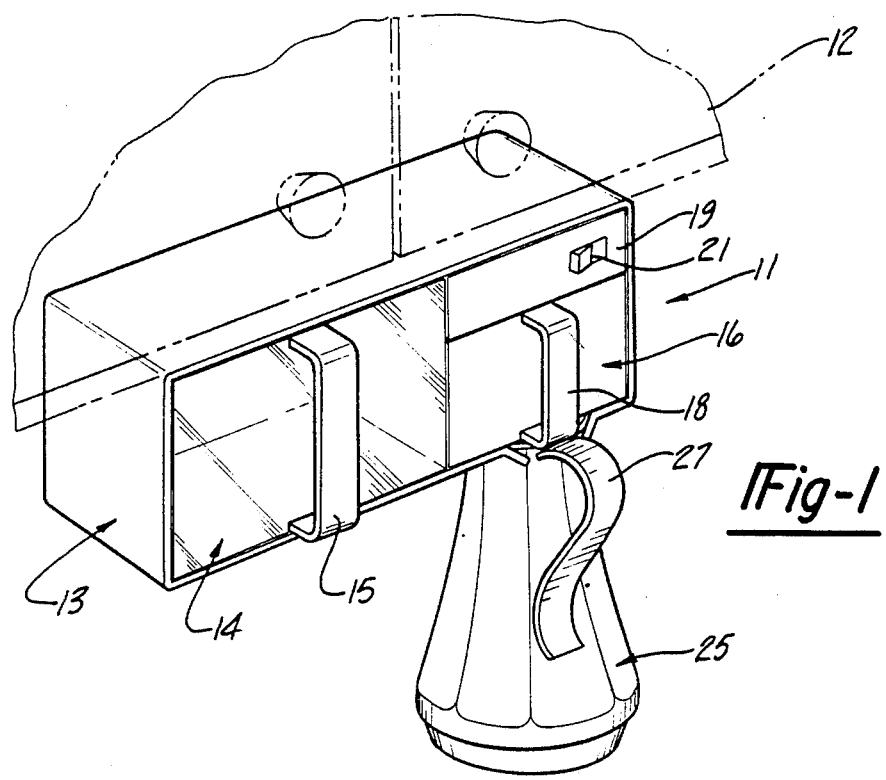
FIG. 1 is a perspective view of an automatic coffee maker constructed in accordance with a first embodiment of the invention.
Figure 2:
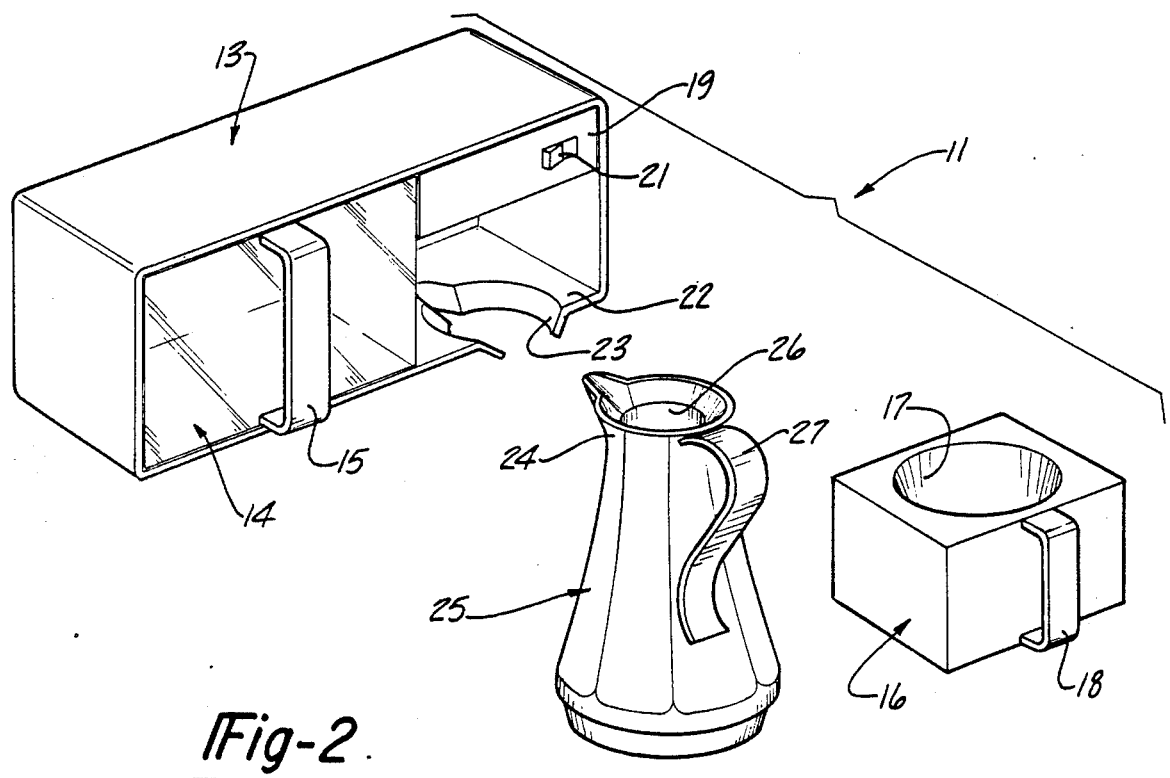
FIG. 2 is a partially exploded view of the embodiment.

Referring first to FIGS. 1 and 2, an automatic drip coffee maker constructed in accordance with this embodiment is identified generally by the reference numeral 11. As will be noted, the coffee maker 11 is designed and configured so that it is adapted to be supported other than upon a counter top and may be mounted underneath a cabinet, shown in phantom in FIG. 1 and identified by the reference numeral 12. The mounting may be either to the base of the cabinet 12 or upon the adjacent wall. For this reason, the coffee maker 11 need not be mounted under a cabinet but may be mounted at any convenient wall location.

The coffee maker 11 includes a main housing, indicated generally by the reference numeral 13 which is formed of any suitable material such as a molded plastic. The housing 13 has bottom, side, top and back walls and defines a generally rectangular opening that faces outwardly toward the forward portion of the unit. This opening is made up of two generally rectangular sections which are of slightly different sizes, for a reason which will become apparent.

A water compartment, indicated generally by the reference numeral 14 is adapted to be positioned in the larger of these openings and is readily removable from this opening. The water compartment 14 is formed with a handle 15 on its front face so as to assist in insertion and removal. In addition, the front of the water compartment 14 is provided with suitable graduations and may be completely transparent or may only have a viewing window so as to permit the user to insert the appropriate amount of water for the number of brewed cups of coffee desired.

The other of the rectangular openings formed in the face of the housing 13 is adapted to receive a removable filter compartment, indicated generally by the reference numeral 16. The filter compartment 16 has an internal cavity 17 in which a coffee filter of an appropriate configuration is received so as to hold ground coffee. In addition, a handle 18 is formed on the front face of the filter compartment 16 so as to facilitate insertion and removal of the filter compartment 16 into the main housing 13.

The housing 13 is provided with a control unit 19 that is positioned to one side of the water compartment 14 and above the filter compartment 16. A main control switch 21 is carried by the control panel 19. The control panel 19 controls a heating device that communicates in a known manner with the water in the water compartment 14 for heating the water to a boiling temperature and for delivering the heated water to the open mouth of the filter compartment 17 for brewing coffee in a known manner.

A lower wall 22 of the housing 13 which is adapted to support the filter compartment 16 is provided with a bayonet type opening 23 that is adapted to receive and support a neck 24 of an insulated carafe, indicated generally by the reference numeral 25. The carafe 25 is provided with a suitable thermal insulation, such as a vacuum glass filler and has its mouth 26 supported within the opening 23 in such a manner as to register with the outlet end of the filter compartment 16. As a result, brewed coffee will be delivered directly into the insulated carafe 25 through its mouth 26.

It should be seen from FIGS. 1 and 2 that the carafe 25 may be conveniently inserted into and removed from the housing 13 by sliding its neck 25 into registry with the mating opening 23. Since the carafe 25 is supported by its neck rather than its base, it is possible to provide a very compact coffee maker. The carafe 25 may be provided with a handle 27 so as to permit ease of insertion, removal and serving. A suitable stopper (not shown) is provided for closing the mouth 26 of the carafe 25 once it has been filled with brewed coffee.

Figure 3:
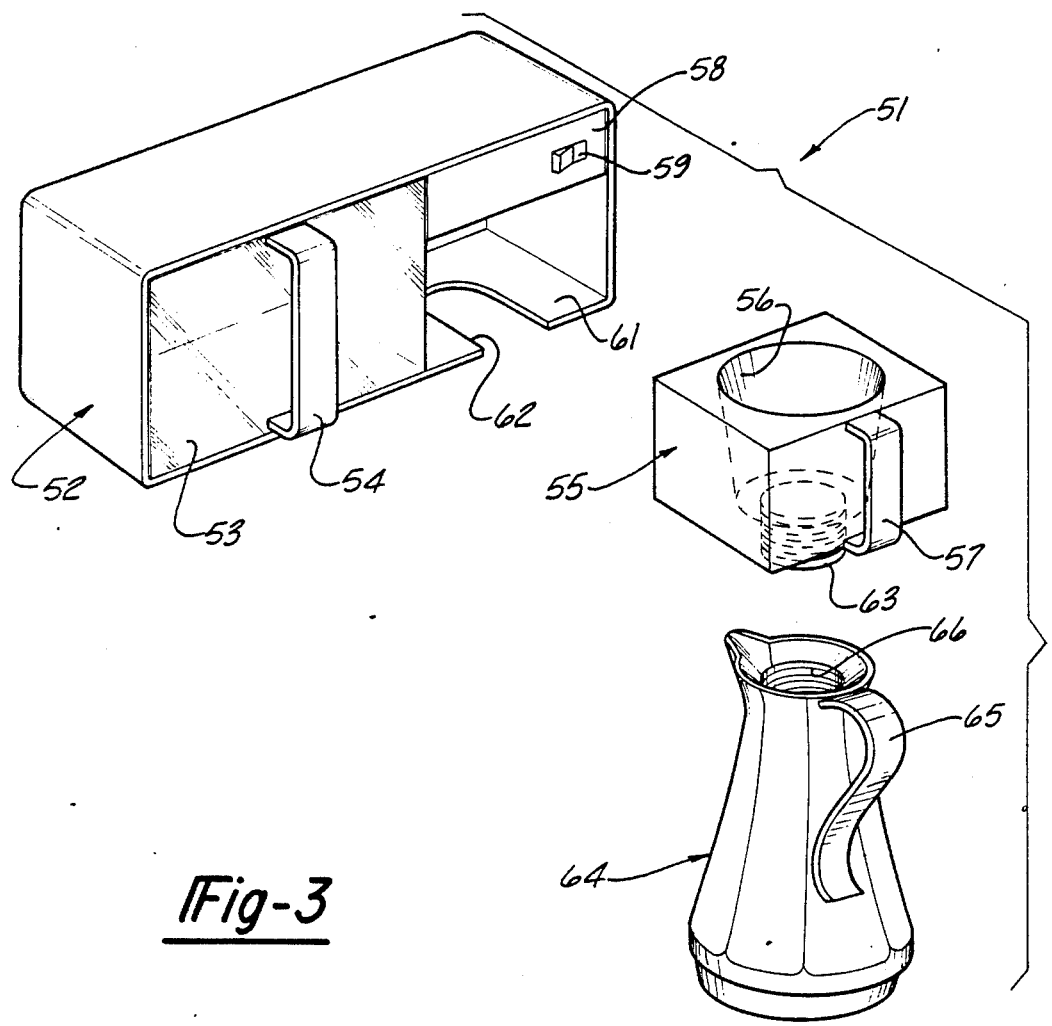
FIG. 3 is a partially exploded view, in part similar to FIG. 2, showing a second embodiment of the invention.

A coffee maker constructed in accordance with another embodiment of the invention is shown in FIG. 3 and is identified generally by the reference numeral 51. The coffee maker 51 has an outer housing 52 that is adapted to be mounted in a manner similar to the embodiment of FIGS. 1 and 2 and, for that reason, the associated cabinet and/or wall has not been illustrated.

The housing 52 has a top, bottom, side and rear wall similar to the previously described embodiment and has a front opening that is made up of two rectangular sections. A removable water container 53 having a handle 54 is received in one of these openings, as in the previously described embodiment. In addition, the other of these openings is adapted to receive a filter container 55 that has a central opening 56 in which a filter (not shown) is received. A handle 57 is provided for ease of insertion and removal of the filter container 55 into the housing 52.

A combined control panel is positioned above the opening that receives the filter compartment 55 and has a main control switch 59. An internal heating element heats water from the water container 53 and delivers it to the open mouth of the filter container 55 as in the previously described embodiment.

In this embodiment, the lower wall 61 of the housing 52 is provided with a notched opening 62. The filter compartment 55 has a downwardly projecting neck 63 that is adapted to extend through the opening 62 and which is externally threaded.

An insulated carafe 64 is provided that is insulated in a suitable manner, as described in conjunction with the carafe 25 of the previously described embodiment. The carafe 64 has a handle 65 and a neck 66 that is internally threaded so as to receive the mating closure. The thread 63 of the filter compartment 55 match the threads of the neck 66 so that the carafe 64 may be threaded onto the filter compartment 55 or vice versa so as to support the carafe 64 from the housing 52 when the filter compartment 55 is inserted.

In this embodiment, the user may fill the recess 56 of the filter compartment 55 with a suitable filter paper and coffee when the container 55 is removed from the housing 52. The filter container 55 is then screwed onto the carafe 66 and the resulting sub-assembly is inserted into the housing 52 and the switch 59 is actuated so as to initiate coffee brewing. Once the coffee brewing cycle is completed, the carafe 64 and filter container 55 may be removed as a sub-assembly and the filter container 55 unscrewed for cleaning. The stopper (not shown) is then positioned into the carafe and the brewed coffee will be maintained at an elevated temperature by the insulation of the carafe 64.

It should be readily apparent from the aforenoted described that the two embodiments of the invention illustrated and described provide an extremely compact arrangement and, furthermore, the brewed coffee will be of high quality and held at an elevated temperature for a long period of time due to the use of the insulated carafe. Although two embodiments of the invention have been illustrated and described, various changes and modifications may be made, without departing from the spirit and scope of the invention as defined by the appended claims.

I claim:

1. An automatic coffee maker adapted to be supported by means other than standing upon a counter top for delivery into a removable brewed coffee container having a neck defining a fill and pouring opening and a base for supporting said serving container on a table or the like comprising a main housing, a water compartment carried by said main housing and adapted to hold an amount of water, heating means for heating the water from said water compartment, a filter compartment carried by said main housing and adapted to contain coffee, means for communicating heated water from said heating means to said filter compartment, said filter compartment having a brewed coffee outlet for discharging liquid brewed coffee, and container supporting means carried by said housing and adapted to detachably support a brewed coffee container other than by its base and with its mouth adapted to receive the brewed coffee from said filter compartment.

2. An automatic coffee maker of claim 1 wherein the container supporting means supports the brewed coffee container from its neck.

3. An automatic coffee maker of claim 2 wherein the container supporting means supports the neck of the container from its exterior.

4. an automatic coffee maker of claim 2 wherein the container supporting means supports the container neck from internally of its fill and pouring opening.

5. An automatic coffee maker of claim 4 wherein the container supporting means supports the container by means of a threaded connection.

6. An automatic coffee maker adapted to be supported by means other than standing upon a counter top comprising a main housing, a water compartment carried by said main housing and adapted to hold an amount of water, heating means for heating the water from said water compartment, a filter compartment carried by said main housing and adapted to contain coffee, means for communicating heated water from said heating means to said filter compartment, said filter compartment having a brewed coffee outlet for discharging liquid brewed coffee, and container supporting means carried by said housing and adapted to support a brewed coffee container other than by its base and with its mouth adapted to receive the brewed coffee from said filter compartment, said housing means having a generally rectangular configuration with a generally open front defining a first rectangular shaped recess for removably receiving said water compartment and a second generally rectangular recess for receiving said filter compartment.

7. An automatic coffee maker of claim 6 wherein the brewed coffee container has a fill and pouring opening defined by a neck and the container supporting means supports the brewed coffee container from said neck.

8. An automatic coffee maker of claim 7 wherein the container supporting means supports the neck of the container from its exterior.

9. An automatic coffee maker of claim 8 wherein the housing is formed with a bayonet shaped opening in the lower wall under the filter compartment for supporting the container neck.

10. An automatic coffee maker of claim 7 wherein the container supporting means supports the container neck from internally of its fill and pouring opening.

11. An automatic coffee maker of claim 10 wherein the container supporting means supports the container by means of a threaded connection.

12. An automatic coffee maker of claim 11 wherein the filter compartment has a male threaded outlet adapted to be received in a female threaded opening formed in the mouth of the container.

* * * * *